(12) United States Patent
Mehta et al.

(10) Patent No.: US 7,348,371 B2
(45) Date of Patent: Mar. 25, 2008

(54) CELLULOSIC-REINFORCED COMPOSITES HAVING INCREASED RESISTANCE TO WATER ABSORPTION

(75) Inventors: Sameer D. Mehta, Mason, OH (US); Manivakkam J. Shankernarayan, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 300 days.

(21) Appl. No.: 11/312,617

(22) Filed: Dec. 20, 2005

(65) Prior Publication Data

US 2007/0141337 A1    Jun. 21, 2007

(51) Int. Cl.
*C08K 11/00* (2006.01)

(52) U.S. Cl. .......................... 524/13; 524/15; 524/502; 524/506; 524/515; 524/521; 525/100; 525/106; 525/191; 525/209; 525/326.5

(58) Field of Classification Search ...................... None
See application file for complete search history.

(56) References Cited

U.S. PATENT DOCUMENTS

| | | |
|---|---|---|
| 3,225,018 A | 12/1965 | Zutty et al. |
| 3,392,156 A | 7/1968 | Donaldson |
| 3,644,323 A | 2/1972 | Norwood et al. |
| 3,646,155 A | 2/1972 | Scott |
| 4,748,221 A | 5/1988 | Collomb et al. |
| 5,164,432 A | 11/1992 | Dehennau et al. |
| 6,270,883 B1 | 8/2001 | Sears et al. |
| 6,780,359 B1 | 8/2004 | Zehner et al. |
| 2003/0228454 A1 | 12/2003 | Barlow et al. |
| 2004/0072924 A1* | 4/2004 | Sigworth et al. ........... 523/200 |
| 2004/0140592 A1 | 7/2004 | Barlow et al. |
| 2005/0043455 A1 | 2/2005 | Hohner |
| 2005/0187315 A1 | 8/2005 | Dean |

FOREIGN PATENT DOCUMENTS

| | | |
|---|---|---|
| GB | 2203743 A | 10/1988 |
| WO | WO 02/10272 A1 | 2/2002 |
| WO | WO 2006/060714 A1 | 6/2006 |

* cited by examiner

*Primary Examiner*—Marc S. Zimmer
(74) *Attorney, Agent, or Firm*—Gerald A. Baracka; William A. Heidrich

(57) ABSTRACT

Cellulosic-reinforced composites having increased resistance to water absorption are provided. The improved composites are obtained using a mixture of high density polyethylene and silane copolymer with the cellulosic filler.

16 Claims, No Drawings

CELLULOSIC-REINFORCED COMPOSITES HAVING INCREASED RESISTANCE TO WATER ABSORPTION

BACKGROUND OF THE INVENTION

1. Field of the Invention

Cellulosic-reinforced polyolefin composites which exhibit markedly reduced water absorption are provided. More specifically, the improved composites of the invention comprise a cellulosic filler with a polyolefin matrix polymer comprised of a high density polyethylene resin and a silane copolymer at prescribed weight ratios.

2. Description of the Prior Art

Usage of Cellulosic-reinforced composites and, more specifically, plastic composites has grown in recent years as consumers discover the advantages of these products compared to wood. In view of their physical properties and low maintenance they are increasingly being utilized for installations in environments which are unfavorable to the use of wood, e.g., where cracking, warping, rotting, attack by insects typically would be expected.

Furthermore, cellulosic-reinforced plastic components are not limited to utilitarian applications, i.e., for extruded profiles such as decking boards and the like. They are equally useful for the manufacture of injection molded or compression molded decorative parts, such as might be used for interior or exterior trim.

Numerous plastic resins including high density polyethylene (HDPE); low-density polyethylene (LDPE); polyvinyl chloride; polypropylene; ethylene-vinyl acetate; acrylonitrile-butadiene-styrene (ABS); polystyrene has been used to form composites with cellulosic fillers such as sawdust; wood chips; wood fibers; wood particles; ground wood; wood flour; wood flakes; rice hulls; coconut shells and peanut shells; bagasse and plant fibers.

The amount of cellulosic filler used will vary depending on the particular resin and fiber being used and the intended application. In general, however, about 40-60% cellulosic filler is utilized for extruded deck profiles and lower filler loadings, on the order of 20-30%, are used for pieces which are molded.

A common problem associated with the use of wood-filled composites for exterior applications is their tendency to absorb water. Water absorption swells the fibers at the surface of the composite which in turn causes stresses that can lead to cracking. It would be highly advantageous if composites having good physical properties, moldability and reduced water absorption were available. These and other advantages are obtained with the composites of the present invention.

SUMMARY OF THE INVENTION

The present invention is directed to cellulosic-reinforced polyolefin composites having significantly improved resistance to water absorption. In their broadest terms, the composites of the invention comprise a cellulosic filler, preferably a wood filler, dispersed in a polyolefin matrix polymer which is a mixture of a high density polyethylene resin and a silane copolymer resin.

More specifically, the composites are comprised of 35 to 85 wt. % polyolefin matrix polymer consisting of a high density polyethylene resin having a density in the range 0.935 to 0.970 g/cm$^3$ and a silane copolymer, the weight ratio of said high density polyethylene to said silane copolymer ranging from 50:1 to 1:50; and 15 to 65 wt. % cellulosic filler. Preferably, the high density polyethylene is a copolymer of ethylene an butene-1, hexene-1 or octene-1 and has a density from 0.940 to 0.965 g/cm$^3$ and the silane copolymer is an ethylene polymer having silane functionality incorporated in the polymer chain by copolymerization or attached to the polymer chain by grafting. Particularly, useful composites contain 40 to 80 wt. % polyolefin matrix polymer wherein the weight ratio of high density polyethylene resin to silane copolymer resin is from 20:1 to 1:1 and 20 to 60 wt. % wood flour.

The composites may additionally contain from 0.01 up to about 25 wt. % of one or more additives. Metal carboxylates, functionalized ethylene polymers and mineral fillers are particularly useful additives.

DETAILED DESCRIPTION

The compositions of the invention are cellulosic-reinforced plastic composites suitable for the manufacture of extruded profiles and for the fabrication of injection molded or compression molded goods. More specifically, the composites of the invention are obtained using a mixture of high density polyethylene (HDPE) resin and silane copolymer with a cellulosic filler. The HDPE/silane copolymer mixture, also referred to herein as the polyolefin matrix polymer, is generally present in an amount from about 35 to about 85 weight percent (wt. %), with the cellulosic filler comprising about 15 to 65 wt. %. Weight percentages referred to herein are based on the total weight of the composition unless otherwise noted. The composites may also contain other ingredients, typically not exceeding about 25 wt. %.

HDPE resins known to the art can be used with the silane copolymer to obtain the matrix polymers used to form the composites. All or a portion of the HDPE may be recycled/reprocessed material. Recycled materials are commonly used for the manufacture of composites and typically are mixtures of HDPE and other resins.

Useful HDPEs have densities in the range 0.935 to 0.970 g/cm$^3$. The resins can be produced using Ziegler-Natta type catalysts or by the so-called Phillips processes which utilize supported chromium or modified chromium catalysts.

Phillips' HDPE polymerization processes are well known and described in the prior art, e.g., U.S. Pat. No. 3,644,323 which is incorporated herein by reference. These types of polymerizations are generally carried out at low pressures in a liquid organic medium at temperatures from about 150 to 350° F. The chromium catalysts are typically prepared by impregnating the support with a solution of a chromium compound and then activating by calcining in air. The chromium catalyst is typically suspended in the organic medium and the reaction conducted at a pressure, e.g., 100 to 800 psig sufficient to maintain the organic diluent and at least a portion of the olefin in the liquid phase. The weight percentage of ethylene in the reactor is generally maintained from about 1.5 up to about 7 and a small amount of one or more other C$_{4-8}$ α-olefins is included with the ethylene.

Processes for the polymerization of ethylene using Ziegler-Natta catalysts are also well known as are products produced by these processes. See, for example, U.S. Pat. No. 4,748,221, details of which are incorporated herein by reference. Processes of this type for the polymerization of ethylene are most generally carried out in the gas phase using catalyst systems consisting of a catalyst comprising atoms of halogen, magnesium and transition metal and an organometallic cocatalyst, preferably an organoaluminum compound. These polymerizations are most commonly carried out in fluidized bed or stirred bed reactors. Small amounts of $C_{4-8}$ α-olefin comonomers are typically copolymerized with the ethylene.

Useful HDPE resins may also be obtained using polymerization processes wherein ethylene is polymerized in the presence of a Ziegler-Natta catalyst in a first reactor and then, in a second reactor, copolymerized with a $C_{4-8}$ α-olefin using the same or different catalyst. Such polymerizations can be connected in a sequential or parallel manner. In both cases the products of the two reactors are mixed. Typically, polymerizations of this type are carried out in a suitable hydrocarbon solvent.

Preferred HDPEs for the invention obtained by any of the above-described polymerization processes are copolymers of ethylene and butene-1, hexene-1 or octene-1 having densities from 0.940 to 0.965 g/cm$^3$ and, most preferably, from 0.945 to 0.960 g/cm$^3$. Melt indexes (MIs) of the HDPE copolymers will generally be in the range 0.01 to 50 g/10 min and, more preferably, from 0.1 to 20 g/10 min. Densities and MIs referred to herein are determined in accordance with ASTM D 1505 and ASTM D 1238-01, condition 190/2.16, respectively.

Silane copolymers combined with the HDPE resin to form the matrix polymer are ethylene polymers having silane functionality ether incorporated in the polymer chain by copolymerization or attached to the polymer chain by grafting.

Silane compounds grafted or copolymerized to incorporate the silane functionality are unsaturated alkoxysilanes of the formula $H_2C=CH—Si—(OR)_3$ where R is a $C_{1-4}$ alkyl group. Vinyltrimethoxysilane (VTMOS), i.e., where R is a methyl group, and vinyltriethoxysilane (VTEOS), where R is an ethyl group, are especially useful. Silane-modified polyolefins obtained by grafting unsaturated alkoxysilanes to ethylene polymers are disclosed in U.S. Pat. No. 3,646,155 which is incorporated herein by reference. Silane-modified polyolefins obtained by copolymerizing ethylene with unsaturated alkoxysilanes are disclosed in U.S. Pat. Nos. 3,225,018 and 3,392,156, which are incorporated herein by reference.

The amount of alkoxysilane incorporated by polymerization or grafting can range from 0.1 to 20 wt. % and, more preferably, will be in the range 0.5 to 7.5 wt. %. MIs of the silane-copolymer can range from about 0.05 to about 50 g/10 min and, more preferably, are in the range 0.25 to 40 g/10 min. While densities of the silane copolymer can range from about 0.865 up to about 0.965 g/cm$^3$, densities are more preferably in the range 0.915 to 0.960 g/cm$^3$.

When the silane-functionalized component is obtained by copolymerization, one or more other olefinic monomers may also be present with the ethylene and vinyltrialkoxysilane. α-Olefin comonomers are especially useful. When present, these comonomers may constitute up to 20 wt. % of the copolymer but are more preferably present in amounts less than 10 percent. Illustrative comonomers which can be copolymerized with the ethylene and vinyltrialkoxysilane include: α-olefins such as propylene, butene-1, hexene-1 and octene-1; vinyl esters such as vinyl acetate and vinyl butyrate; olefinically unsaturated carboxylic acids and their esters such as methacrylic acid, acrylic acid, methyl acrylate and methyl methacrylate; vinyl ethers such as methyl vinyl ether; acrylonitrile; and the like.

When the silane-functionalized copolymer is obtained by grafting, the ethylene polymer being grafted is preferably an ethylene homopolymer or copolymer of ethylene with a $C_{3-8}$ α-olefin comonomer. Useful homopolymers and copolymers which can be grafted include LDPE, HDPE, very low density polyethylene (VLDPE), linear low density polyethylene (LLDPE and mLLDPE), medium density polyethylene (MDPE), and very high or ultra high molecular weight polyethylene produced using known polymerization catalysts, including metallocene single-site catalysts, and processes. The polyethylene resin being grafted can be, but need not be, the same HDPE resin used to form the matrix polymer blend.

To obtain the matrix polymer, the HDPE and silane copolymer are combined at a weight ratio from 50:1 to 1:50 (HDPE: silane copolymer) and, more preferably, at a weight ratio from 20:1 to 1:1.

The polyolefin matrix polymer comprises 35 to 85 wt. % and, more preferably, from 40 to 80 wt. % of the composite. The cellulosic filler comprises 15 to 65 wt. % and, more preferably, 20 to 60 wt. % of the composite. In a highly useful embodiment, the composites contain 45 to 75 wt. % matrix polymer and 25 to 55 wt. % cellulosic filler.

Useful cellulosic materials can be any of the known products available from a variety of natural sources or by-products from various processes. These can include such diverse materials as paper, cardboard, wheat pulp, rice hulls, coconut shells, peanut shells, corn cobs, sawdust, wood chips, wood fiber, wood flakes, wood flour, ground wood, palm fiber, bamboo fiber, bagasse, jute, flax and the like. Of these, wood fillers are particularly useful.

In one highly useful embodiment, the cellulosic filler is a wood flour. Wood flours are widely available materials produced by pulverizing various wood residues from commercial operations, e.g., sawdust, using hammer mills or suitable equipment to reduce the particle size. Wood flours are typically classified based on the size of screen mesh through which the material will pass and 30 to 150 mesh materials are most commonly used.

Other ingredients, i.e., additives, commonly used to improve compatibility of cellulosic materials with thermoplastic resins, facilitate processing, improve physical properties, improve thermal and oxidative resistance, reduce UV degradation and the like may also be included in the compositions of the invention. In general, the combined amount of such additives will range from about 0.01 wt. % up to about 25 wt. % and, more preferably, from about 0.1 up to about 10 wt. %. In a highly useful embodiment, the combined weight of additives is from 0.25 to 7.5 wt. %.

In one highly useful embodiment of the invention, the composite contains 0.01 to 2 wt. % metal carboxylate. Useful metal carboxylates include Ca, Ba, Sn, Pb and Zn salts of $C_{2-18}$ carboxylic acids and, more preferably, $C_{12-18}$ carboxylic acids. The inclusion of one or more of these compounds has been shown to improve processing and/or physical properties, including increasing resistance to water absorption. Metal carboxylates of particular interest include zinc stearate, calcium stearate, dibutyltin dilaurate, stannous acetate, stannous octanoate and zinc octanoate.

In another highly useful embodiment, 0.1 to 10 wt. % of a functionalized ethylene homopolymer or copolymer is included in the formulation. Ethylene (co)polymers functionalized by grafting with 0.1 to 5 wt. % ethylenically unsaturated carboxylic acid or acid derivative are known. Grafted ethylene polymers of this type, and particularly ethylene polymers grafted with maleic anhydride, are useful compatibilizing agents and may be advantageously employed to incorporate the cellulosic fillers in the matrix polymer for the present invention.

Fillers, when employed, will generally be used in amounts from about 1 up to about 20 wt. %, based on the total weight of the composite. Useful mineral fillers include hydrated aluminum oxides, hydrated magnesia, calcium carbonate, hydrated calcium silicate, zinc borate, magnesium silicate and hydrated magnesium silicate, silica gel, fumed silica, talc, quartz, mica, clays such as bentonite, montmorillonite, attapulgite, kalonite and the like.

The HDPE, silane polymer and cellulosic filler, and such other additives as may be included in the formulation to produce the finished composite, can be blended and pelletized in accordance with known and generally accepted practices using conventional equipment commonly employed in the resin compounding arts. The compositions can be further fabricated by melt extrusion, injection molding, compression molding or the like to obtain the finished product.

The following examples illustrate the invention; however, those skilled in the art will recognize numerous variations that are within the spirit of the invention and scope of the claims.

The composites were prepared by blending the HDPE, silane polymer, cellulosic filler and any additional ingredients using a Haake counter-rotating, conical twin screw extruder having an effective barrel length of 300 mm. The temperature ranged from 160° C. to 21 0° C. over the length of the extruder and die.

Samples used for the water absorption test and other physical testing were prepared by cutting test specimens from either 75 mil- or 120 mil-thick plaques formed by pressing the composite material in a 7 inch×7 inch mold on a 40 ton PHI press.

Water absorption was determined using weighed 1 inch×2 inch rectangular samples cut from the 120 mil-thick plaques. The samples were then immersed in distilled water and allowed to stand at room temperature. The samples were removed periodically, wiped dry, reweighed and percent water absorption calculated.

Physical properties, where reported, were determined in accordance with the following procedures:

Flexural Modulus—ASTM D 790

Tensile Brea—ASTM D 638

Tensile Modulus—ASTM D 638

Notched Izod—ASTM D 256

Unnotched Izod—ASTM D 4812

Tensile break and tensile modulus were obtained using 75 mil-thick test specimens. Test specimens for all other tests were obtained from the 120 mil-thick plaques.

EXAMPLE 1 AND COMPARATIVE EXAMPLE 2

To demonstrate the superior resistance to water absorption obtained with the compositions of the invention a composite was prepared using 50 wt. % of a matrix polymer containing a mixture of HDPE (ethylene-hexene-1 copolymer; density 0.953 g/cm$^3$; MI 0.3 g/10 min) and a silane copolymer obtained by copolymerizing ethylene with 1.7 wt. % VTMOS. The silane copolymer had a density of 0.923 g/cm$^3$ and MI of 1.5 g/10 min. The weight ratio of HDPE to silane copolymer used to obtain the matrix polymer was 9:1. The matrix polymer was combined with 50 wt. % southern yellow pine wood flour. A comparative formulation which contained no silane copolymer, i.e., comprised of 50 wt. % of the same HDPE and 50 wt. % of the same yellow pine wood flour, was also prepared. Compression molded samples of the product of the invention (Ex. 1) and the comparative control product (Comp. Ex. 2) were evaluated and results are provided in Table 1. It is apparent from the data that a marked increase in resistance to water absorption is achieved with the composite of the invention compared to the comparative composite while maintaining other physical properties within acceptable limits.

EXAMPLES 3, 4 AND 5

To demonstrate the ability to include other additives in the composite formulations, composites were prepared comprised of 49 wt. % matrix polymer, 50 wt. % wood flour and 1 wt. % low density polyethylene containing 1.4 wt. % dibutyltin dilaurate. The HDPE, silane copolymer and wood flour used were the same as in Example 1. The weight percent ratio of HDPE to silane copolymer for the composites of Examples 3, 4 and 5 were 3.9:1, 23.5:1 for Example 4 and 8.8:1, respectively. Results obtained for compression molded plaques of these composites are set forth in Table 1.

EXAMPLE 6

To demonstrate the ability to include a compatibilizing agent in the composites of the invention, a composite was prepared comprised of 50 wt. % wood flour, 47.5 wt. % matrix polymer (weight ratio of HDPE:silane copolymer 8.5:1), 1 wt. % LDPE/dibutyltin dilaurate blend and 1.5 wt. % maleic anhydride grafted HDPE compatibilizing agent. The grafted HDPE (MI 9.5 g/10 min) contained about 2 wt. % maleic anhydride. Test results obtained for molded samples produced from the formulation are included in Table 1.

EXAMPLE 7 AND COMPARATIVE EXAMPLE 8

A composite was prepared in accordance with the invention comprised of 49 wt. % matrix polymer containing a mixture of HDPE (ethylene-hexene-1 copolymer; density 0.952 g/cm$^3$, MI 0.3 g/10 min) and silane copolymer of Example 1. The weight ratio of HDPE to silane copolymer was 3.9:1. Fifty (50) wt. % oak wood flour and 1 wt. % zinc stearate were blended with the matrix polymer. Compression molded samples of the composite were prepared and evaluated and results are tabulated in Table 1. A comparative composite (50 wt. % oak wood flour; 49 wt. % HDPE; 1 wt. % zinc stearate) was also prepared and evaluated. Results for the comparative composite (Comparative Example 8) are also provided in Table 1. The marked and unexpected improvement in resistance to water absorption achieved with the compositions of the invention is readily apparent from a comparison of the data.

EXAMPLE 9

To demonstrate the ability to achieve improved resistance to water absorption using matrix polymers comprised of HDPE and a grafted silane copolymer Example 7 was repeated except that the silane copolymer used was commercial polyethylene resin grafted with approximately 1.6 wt. % VTMOS. Type and amounts of other components employed for the formulation were identical to that of Example 7. Test results are provided in Table 1.

TABLE 1

|  | 1% Flexural Modulus (kpsi) | Tensile Strength at Break (psi) | Tensile Modulus (psi) | 23° C. IZOD Notched | 23° C. IZOD Unnotched | Percent Water Absorption 11 Days | 20 Days | 33 Days | 53 Days |
|---|---|---|---|---|---|---|---|---|---|
| Ex. 1 | 270 | 2760 | 112 | 0.64 | 1.44 | 3.4 | 4.3 | 5.4 | 6.4 |
| Comp Ex. 2 | 322 | 2500 | 189 | 0.58 | 1.27 | 5.7 | 5.7 | 11.1 | 12.2 |
| Ex. 3 | 289 | 2340 | 123 | 0.56 | 1.12 | 4.0 | 5.2 | 6.2 | 7.0 |
| Ex. 4 | 315 | 2480 | 113 | 0.48 | 1.32 | 2.9 | 4.3 | 4.6 | 5.2 |
| Ex. 5 | 290 | 2400 | 103 | 0.56 | 1.35 | 3.7 | 4.6 | 5.8 | 6.5 |
| Ex. 6 | 280 | 2490 | 105 | 0.73 | 1.44 | 2.6 | 3.3 | 3.9 | 4.5 |
| Ex. 7 | 271 | 1401 | 113 | 0.62 | 1.03 | 2.4 | 3.2 | 4.0 | 5.1 |
| Comp. Ex. 8 | 252 | 1310 | 108 | 0.63 | 1.01 | 4.3 | 5.5 | 6.9 | 8.5 |
| Ex. 9 | 281 | 1515 | 126 | 0.77 | 1.34 | 2.2 | 2.9 | 3.7 | 4.4 |

EXAMPLES 10-13

Additional composites were prepared in accordance with the invention as follows:

|  | Ex. 10 | Ex. 11 | Ex. 12 | Ex. 13 |
|---|---|---|---|---|
| Oak Wood Flour (wt. %) | 50 | 50 | 50 | 50 |
| Matrix Polymer (wt. %)[4] | 49[1] | 47[1] | 49[2] | 47[2] |
| HDPE:Silane Copolymer Wt. Ratio | 8.8:1 | 8.4:1 | 8.8:1 | 8.4:1 |
| Zinc Stearate (wt. %) | 1 | 1 | 1 | 1 |
| Maleic Anhydride Grafted HDPE[3] | — | 2 | — | 2 |

[1]Silane copolymer of Example 9
[2]Silane copolymer of Example 1
[3]From Example 6
[4]HDPE of Example 7

Results obtained for water absorption studies carried out on compression molded samples of the composites were as follows:

|  | Percent Water Absorption After | | | |
|---|---|---|---|---|
|  | 11 Days | 20 Days | 33 Days | 53 Days |
| Ex. 10 | 2.1 | 2.6 | 3.4 | 4.0 |
| Ex. 11 | 1.5 | 1.9 | 2.5 | 3.0 |
| Ex. 12 | 2.4 | 3.2 | 3.9 | 4.8 |
| Ex. 13 | 2.1 | 2.6 | 3.3 | 4.1 |
| Control[5] | 4.3 | 5.5 | 6.9 | 8.5 |

[5]50 wt. % oak wood flour, 49 wt. % HDPE and 1 wt. % Zn stearate

We claim:

1. A cellulosic-reinforced composite comprising:
   (a) 35 to 85 wt. % polyolefin matrix polymer consisting of:
      (i) a high density polyethylene resin having a density in the range 0.935 to 0.970 g/cm$^3$ and
      (ii) a silane copolymer, the weight ratio of said high density polyethylene to said silane copolymer ranging from 50:1 to 1:50; and
   (b) 15 to 65 wt. % cellulosic filler.

2. The composite of claim 1 wherein the high density polyethylene is a copolymer of ethylene and butene-1, hexene-1 or octene-1 and has a density from 0.940 to 0.965 g/cm$^3$.

3. The composite of claim 2 wherein the high density polyethylene has a density from 0.945 to 0.960 g/cm$^3$ and melt index from 0.01 to 50 g/10 min.

4. The composite of claim 1 wherein the silane copolymer is an ethylene polymer having silane functionality incorporated in the polymer chain by copolymerization or attached to the polymer chain by grafting.

5. The composite of claim 4 wherein the silane copolymer has from 0.1 to 20 wt. % alkoxysilane of the formula $H_2C{=}CH{-}Si{-}(OR)_3$ where R is a $C_{1-4}$ alkyl group incorporated by copolymerization or grafting.

6. The composite of claim 5 wherein the silane copolymer has a density from 0.865 to 0.965 g/cm$^3$ and melt index from 0.05 to 50 g/10 min.

7. The composite of claim 6 wherein the silane copolymer is a copolymer of ethylene and 0.5 to 7.5 wt. % vinyltrimethoxysilane having a density from 0.915 to 0.960 g/cm$^3$ and melt index from 0.25 to 40 g/10 min.

8. The composite of claim 1 wherein the weight ratio of high density polyethylene to silane copolymer is from 20:1 to 1:1.

9. The composite of claim 1 wherein the cellulosic filler is a wood filler and comprises 20 to 60 wt. % of the composite.

10. The composite of claim 9 wherein the wood filler is wood flour.

11. The composite of claim 1 containing 0.01 to 25 wt. % additional additives.

12. The composite of claim 11 which contains 0.01 to 2 wt. % metal carboxylate.

13. The composite of claim 11 which contains 0.1 to 10 wt. % ethylene polymer grafted with 0.1 to 5 wt. % ethylenically unsaturated carboxylic acid or acid derivative.

14. The composite of claim 11 which contains 1 to 20 wt. % mineral filler.

15. A cellulosic-reinforced composite comprising:
   (a) 35 to 85 wt. polyolefin matrix polymer consisting of a mixture of
      (i) high density copolymer of ethylene and butene-1, hexene-1 or octene-1 having a density from 0.940 to 0.965 g/cm$^3$ and melt index from 0.01 to 50 g/10 min and
      (ii) ethylene polymer having 0.1 to 20 wt. % alkoxysilane of the formula $H_2C{=}CH{-}Si{-}(OR)_3$ where R is a $C_{1-4}$ alkyl group incorporated in the polymer chain by copolymerization or attached to the polymer chain by grafting, the weight ratio of (i):(ii) ranging from 20:1 to 1:1; and
   (b) 15 to 65 wt. % wood filler.

16. The composite of claim 15 comprising 40 to 80 wt. % (a) and 20 to 60 wt. % wood flour.

* * * * *